(12) United States Patent
Liu et al.

(10) Patent No.: US 9,500,513 B2
(45) Date of Patent: Nov. 22, 2016

(54) MAGNETIC LIQUID LEVEL GAUGE FOR BOILER DRUM WATER LEVEL MEASUREMENT

(71) Applicant: Qinhuangdao Huadian Measurement & Control Equipment Co., Ltd., Haigang Qinhuangdo (CN)

(72) Inventors: Jichuan Liu, Haigang Qinhuangdao (CN); Shengli Yu, Haigang Qinhuangdao (CN); Dong Han, Haigang Qinhuangdao (CN)

(73) Assignee: Qinhuangdao Huadian Measurement & Control Equipment Co., Ltd., Haigang Qinhuangdao Hebei (CN)

( * ) Notice: Subject to any disclaimer, the term of this patent is extended or adjusted under 35 U.S.C. 154(b) by 288 days.

(21) Appl. No.: 14/370,936

(22) PCT Filed: Dec. 31, 2012

(86) PCT No.: PCT/CN2012/088095
§ 371 (c)(1),
(2) Date: Jul. 7, 2014

(87) PCT Pub. No.: WO2013/102428
PCT Pub. Date: Jul. 11, 2013

(65) Prior Publication Data
US 2014/0318480 A1    Oct. 30, 2014

(30) Foreign Application Priority Data

Jan. 8, 2012 (CN) .................... 2012 2 0018989 U
Feb. 2, 2012 (CN) .................... 2012 1 0026960

(51) Int. Cl.
*G01F 23/60* (2006.01)
*F22B 37/42* (2006.01)
(Continued)

(52) U.S. Cl.
CPC ............ *G01F 23/603* (2013.01); *F22B 37/428* (2013.01); *G01F 23/02* (2013.01); *G01F 23/162* (2013.01); *G01F 23/62* (2013.01); *G01F 23/683* (2013.01)

(58) Field of Classification Search
CPC ........ G01F 23/62; G01F 23/64; G01F 23/72; G01F 23/162; G01F 23/02; G01F 23/185; G01F 23/18; G01F 23/603; G01F 23/683; F22B 37/428
See application file for complete search history.

(56) References Cited

U.S. PATENT DOCUMENTS 2,026,299 A * 12/1935 Boyd ...................... G01F 23/62
324/204
2,740,492 A * 4/1956 Williams ........... B01D 17/0208
210/120

(Continued)

FOREIGN PATENT DOCUMENTS

CN    2264365 Y  * 10/1997
CN    2610225      4/2004

(Continued)

*Primary Examiner* — Steven B McAllister
*Assistant Examiner* — Steven Anderson, II
(74) *Attorney, Agent, or Firm* — Schwegman, Lundberg & Woessner, P.A.

(57) ABSTRACT

A magnetic liquid level gauge for measuring a boiler drum water level comprises an external cylinder body having a first upper portion and a first lower portion, and an internal cylinder body having a second upper portion and a second lower portion, the first upper portion and the second upper portion are connected to the boiler drum through a steam side sampling pipe, the second lower portion is connected to a water portion of the boiler drum through the water side sampling pipe, the external cylinder body and the internal cylinder body define a steam heat tracing chamber therebetween. A float inside the internal cylinder body is connected to a magnetic component in a magnetic component cylinder body. A display indicator is connected to a magnetic transmitter and a boiler drum pressure transmitter. A waveguide tube is disposed outside the magnetic component cylinder body and connected to the magnetic transmitter.

7 Claims, 7 Drawing Sheets

(51) Int. Cl.
*G01F 23/62* (2006.01)
*G01F 23/02* (2006.01)
*G01F 23/16* (2006.01)
*G01F 23/68* (2006.01)

(56) References Cited

U.S. PATENT DOCUMENTS

| | | | | |
|---|---|---|---|---|
| 2,998,724 | A * | 9/1961 | Singleton | G01F 23/02 |
| | | | | 122/451 R |
| 3,340,699 | A * | 9/1967 | Post, Jr. | F17C 13/02 |
| | | | | 324/248 |
| 4,647,740 | A * | 3/1987 | Hansen, III | H01H 36/02 |
| | | | | 200/84 C |
| 6,202,676 | B1 | 3/2001 | Bekedam | |
| 2003/0037613 | A1 * | 2/2003 | Mulrooney | G01F 23/263 |
| | | | | 73/323 |
| 2003/0083563 | A1 * | 5/2003 | Katsman | A61B 6/563 |
| | | | | 600/407 |
| 2006/0170543 | A1 * | 8/2006 | Schaffer | G01F 23/284 |
| | | | | 340/521 |
| 2011/0005312 | A1 * | 1/2011 | Hopper | G01F 23/0046 |
| | | | | 73/313 |

FOREIGN PATENT DOCUMENTS

| | | | |
|---|---|---|---|
| CN | 102564534 | | 7/2012 |
| CN | 202599481 | | 12/2012 |
| JP | 2006208141 | | 8/2006 |
| KR | 10-2005-0008959 | * | 1/2005 |
| WO | WO-2006042119 | | 4/2006 |
| WO | WO-2013102428 | | 7/2013 |

* cited by examiner

US 9,500,513 B2

MAGNETIC LIQUID LEVEL GAUGE FOR BOILER DRUM WATER LEVEL MEASUREMENT

PRIORITY CLAIM TO RELATED APPLICATIONS

This application is a U.S. national stage application filed under 35 U.S.C. §371 from International Application Serial No. PCT/CN2012/088095, which was filed Dec. 31, 2012, and published as WO 2013/102428 on Jul. 11, 2013, and which claims priority to Chinese Application No. 201220018989.5, filed Jan. 8, 2012, and which claims priority to Chinese Application No. 201210026960.6, filed Feb. 2, 2012, which applications and publication are incorporated by reference as if reproduced herein and made a part hereof in their entirety, and the benefit of priority of each of which is claimed herein.

FIELD OF THE INVENTION

The present application relates to a new magnetic liquid level gauge for measuring a water level in a boiler drum, which is a device for measuring a water level in a boiler drum. It is an accessory to a boiler.

BACKGROUND OF THE INVENTION

The traditional analog measuring instruments for measuring a water level in a boiler drum have a number of defects. Specifically, they cannot measure the water level in a boiler drum reliably and accurately over the whole working range. The specific analyses are shown as below.

When measuring a water level in a boiler drum under high pressure and high temperature condition, the traditional analog measuring instruments for measuring a water level in a boiler drum generally utilize a single-compartment balance container or an inner balance container for measuring a water level in a boiler drum which is based on the principle of differential pressure measuring.

A single-compartment balance container for measuring a water level in a boiler drum according to FIG. 1 comprises a cylindrical balance container (103), a steam side sampling pipe (102) welded to the left side of the balance container (103), and a positive pressure side outlet pipe (104) welded to the bottom of the balance container (103). A negative pressure side outlet pipe (105) led out from a water side sampling pipe (106) of a boiler drum (101) and the positive pressure side outlet pipe (104) are connected to a differential pressure transmitter (107). The differential pressure transmitter (107) sends an output signal through a cable (108) to a display indicator (109). One of the drawbacks of this design is that the water in the balance container (103) will transfer the heat along the positive pressure side outlet pipe (104), this will result in the water within the positive pressure side outlet pipe (104) having a higher temperature than its surroundings. The temperature difference will introduce an uncertainty to the density of the water within the positive pressure side outlet pipe (104) and the balance container (103), which could not guarantee the accuracy of the measurements (The water within the positive pressure side outlet pipe (104) and the balance container (103) is used as the reference for the measurements). The second drawback is that the water inside the boiler drum (101) is not saturated, the density is uncertain, thus the accuracy of the measurements could not be guaranteed. The third drawback is that under certain conditions (for example, during the starting or shutting off phase, during the water release in the event of pressure, or during boiler maintenance period), the water within the balance container (103) and the positive pressure side outlet pipe (104) which is the reference for the measurements could not be formed in an accurate and timely manner, thus the measurements might be influenced. The fourth drawback is that the clogging, leaking, and other environmental factors that effects the positive pressure side outlet pipe (104) and the negative pressure side outlet pipe (105) will result in inaccurate measurements.

An inner balance container for measuring a water level in a boiler drum according to FIG. 2 comprises a cylindrical condenser (204), a positive pressure side outlet pipe (205) welded to the right side of the condenser (204) and a steam side sampling pipe (203) welded to the left side of the condenser (204). The steam side sampling pipe (203) is connected to a condensation water inlet pipe (202) inside a boiler drum (201) and transfers the condensation water to the balance container (206) within the boiler drum (201). A positive pressure side outlet pipe (209) and a negative pressure side outlet pipe (208) are led out from a boiler drum water side sampling pipe (207) to a differential pressure transmitter (210). The differential pressure transmitter (210) sends out a signal through a cable (211) to a display indicator (212). The drawbacks of this design are that (I) under certain conditions (for example, during the starting or shutting off phase, during the water release in the event of pressure, or during boiler maintenance period), the water column within the balance container (206) and the positive pressure side outlet pipe (209) which is the reference for the measurements could not be formed in an accurate and timely manner, thus the measurements might be influenced. (II) Moreover, the clogging, leaking, and other environmental factors that effects the positive pressure side outlet pipe (209) and the negative pressure side outlet pipe (208) will result in inaccurate measurements.

In addition, the other types of analog measuring instruments for a boiler drum water level, such as a capacitive liquid level gauge, a ray liquid level gauge, and a magnetic liquid level gauge all have issues, such as issues with stability, maintenance, accuracy problem and the lackluster performing results.

A traditional capacitive liquid level gauge according to FIG. 3 comprises a boiler drum (301) and a measuring tube (305), and they are connected to each other through a steam side sampling pipe (302) and a water side sampling pipe (307). A capacitive sensor (306) inside the measuring tube (305) is connected to a transmitter (303) through a connecting flange (304). The drawbacks of this design are that (I) the capacitive sensor (306) is prone to scale formation, and it will produce a significant error in the measuring results. (II) The capacitive liquid level gauge is a U-tube type water level gauge, due to thermodynamic of the configuration, the dispersing of the heat leads to a lower temperature for the water inside the measuring tube (305) compared to the water inside the boiler drum (301). This will produce a relative significant error in the measurements.

A traditional ray liquid level gauge according to FIG. 4 comprises a boiler drum (401) and a measuring tube (405). The boiler drum (401) and the measuring tube (405) are connected through a steam side sampling pipe (402) and a water side sampling pipe (407). A measuring ray detector (406) within the measuring tube (405) is connected to a transmitter (403) through a connecting flange (404). The drawbacks of this design are that (I) the measuring ray detector (406) requires a radioactive source, and thus it is unsuitable for on-site configuration and operation. (II) The ray liquid level gauge is a U-tube type water level gauge, due to thermodynamic of the configuration, the dispersing of the heat leads to a lower temperature for the water inside the measuring tube (405) compared to the water inside the boiler drum (401). This will produce a relative significant error in the measurements.

A traditional magnetic liquid level gauge according to FIG. 5 comprises a boiler drum (501) and a measuring tube (505). The boiler drum (501) and the measuring tube (505) are connected through a steam side sampling pipe (502) and a water side sampling pipe (507). A waveguide sensor (506) is connected to a transmitter (503) through a connecting flange (504), and a magnetic float (508) is disposed on the waveguide sensor (506). The drawbacks of this design are that (I) the magnetic float is prone to magnetism loss under the high temperature condition. (II) The magnetic liquid level gauge is a U-tube type water level gauge, due to thermodynamic of the configuration, the dispersing of the heat leads to a lower temperature for the water inside the measuring tube (505) compared to the water inside the boiler drum (501). This will produce a relative significant error in the measurements.

In summary, there is a need to develop a new magnetic liquid level gauge for measuring a water level in a boiler drum which can have at least one of the following advantages: it can be used in the condition that the boiler drum are at high pressure and high temperature; it can be used under the full range of working conditions; it will be accurate, stable, reliable; and it can provides analog water level signals which can be used for water level adjustment and protection in the boiler drum.

SUMMARY OF THE INVENTION

To resolve at least one of the technical problems of the prior art water level gauge, the present application provides a magnetic liquid level gauge for measuring a water level in a boiler drum which will have at least one of the following advantages: it can be used in the condition that the boiler drum are at high pressure and high temperature; it can prevent the magnetic component from magnetism loss caused by the high temperature; it can apply a compensation equation for improving the measuring precision; it can be used under the full range of working conditions; it will be accurate, stable, reliable; and it can provides analog water level signals which can be used for water level adjustment and protection in the boiler drum.

In the technical solution of the present application according to one embodiment of the present application, the gauge comprises a boiler drum, a steam side sampling pipe, a measuring tube having a dual hull structure comprising an external cylinder body and an internal cylinder body, a condensation water diversion trench, a condensation chamber, an upper thrust spring, a steam heat tracing chamber, a float, a lower thrust spring, an on-site display part, a first cable, a second cable, a third cable, a boiler drum pressure measuring instrument pipe, a display indicator, a water side sampling pipe, a downcomer, a heat tracing pipe, a reducer, a maintenance flange, a connecting bar, a magnetic component, a magnetic component cylinder body, a waveguide tube, a magnetic transmitter, a thermal insulating layer, a drainage pipe, a boiler drum pressure transmitter, and a sampler. An upper portion of the internal cylinder body and an upper portion of the external cylinder body are both connected to the boiler drum through the steam side sampling pipe. A lower portion of the internal cylinder body is connected to a water portion of the boiler drum through the water side sampling pipe, and the sampler is disposed at a sampling point inside the water portion within the boiler drum. A lower portion of the external cylinder body is connected to the downcomer through the heat tracing pipe. The steam heat tracing chamber is formed between the internal cylinder body and the external cylinder body. The condensation chamber is formed above the internal cylinder body, and a bottom of the condensation chamber is connected to a top of the internal cylinder body through the condensation water diversion trench. The upper thrust spring and the lower thrust spring are disposed inside the internal cylinder body. The float is disposed inside the internal cylinder body, and connected to the magnetic component through the connecting bar. The magnetic component cylinder body is located beneath the internal cylinder body, and it is connected to the internal cylinder body through the maintenance flange and the reducer. The drainage pipe is disposed at bottom of the magnetic component cylinder body. The waveguide tube is disposed outside the thermal insulating layer which surrounds the magnetic component cylinder body, and the waveguide tube is connected to the magnetic transmitter disposed at the bottom of the magnetic component cylinder body. The display indicator is connected to the magnetic transmitter through the first cable, to the boiler drum pressure transmitter through the second cable, and to the on-site display part through the third cable. The boiler drum pressure transmitter is connected to the boiler drum through the boiler drum pressure measuring instrument pipe. According to another embodiment of the present application, the magnetic component cylinder body and the magnetic component are located above the internal cylinder body, the magnetic transmitter is disposed away from the magnetic component cylinder body.

The beneficial effects of the present application may include:
1. According to the structure of an embodiment of the present application, the float is connected to the magnetic component through the connecting bar. The magnetic component cylinder body and the internal cylinder body of the measuring tube are connected to each other through the reducer and the maintenance flange. The water temperature at lower portion of the tube is relatively low, thus effectively preventing high temperature magnetism loss for the magnetic component.
2. According to the structure of an embodiment of the present application, the waveguide tube is disposed outside the thermal insulating layer which surrounds the magnetic component cylinder body, and the waveguide tube is connected to the magnetic transmitter which located at the bottom of the magnetic component cylinder body. The configuration is advantages to the electronic component working outside of the magnetic component cylinder body. According to the structure of an embodiment of the present application, the waveguide tube is disposed outside the thermal insulating layer which surrounds the magnetic component cylinder body, and the magnetic transmitter is disposed away from the magnetic component cylinder body. Such a configuration is also advantages to the electronic component working outside of the magnetic component cylinder body.
3. The present application may also apply a compensating equation:

$$h = f(p) \times H$$

wherein, p is the boiler drum pressure;
f(p) is the single value function of the boiler drum pressure;
H is value of the water level detected by the sensors; and
h is the value of the boiler drum water level after compensation calculation.

The measurements taking under various working conditions could be compensated using this equation, thus further improving the measured accuracy of the system.

4. The steam heat tracing chamber of the present application traces heat to sample water inside the internal cylinder body, and such a configuration improves the accuracy of the instruments.
5. Condensation water is continuously formed in the condensation chamber of the present application, and the condensation water replace the sample water inside the internal cylinder body, this will improve the water quality of the water held within the internal cylinder body and reduce the chance for scale formation.

Figure 1:
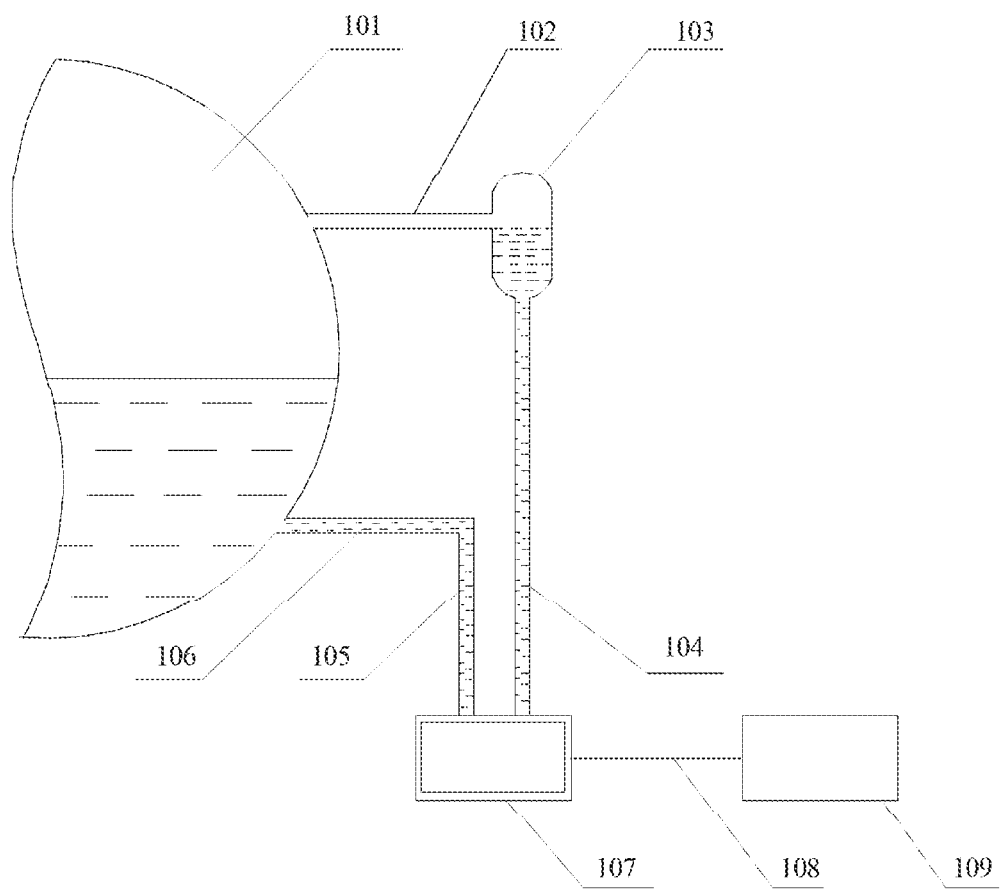
FIG. 1 is a structure diagram of a single-compartment balance container for measuring a water level in a boiler drum.
Figure 2:
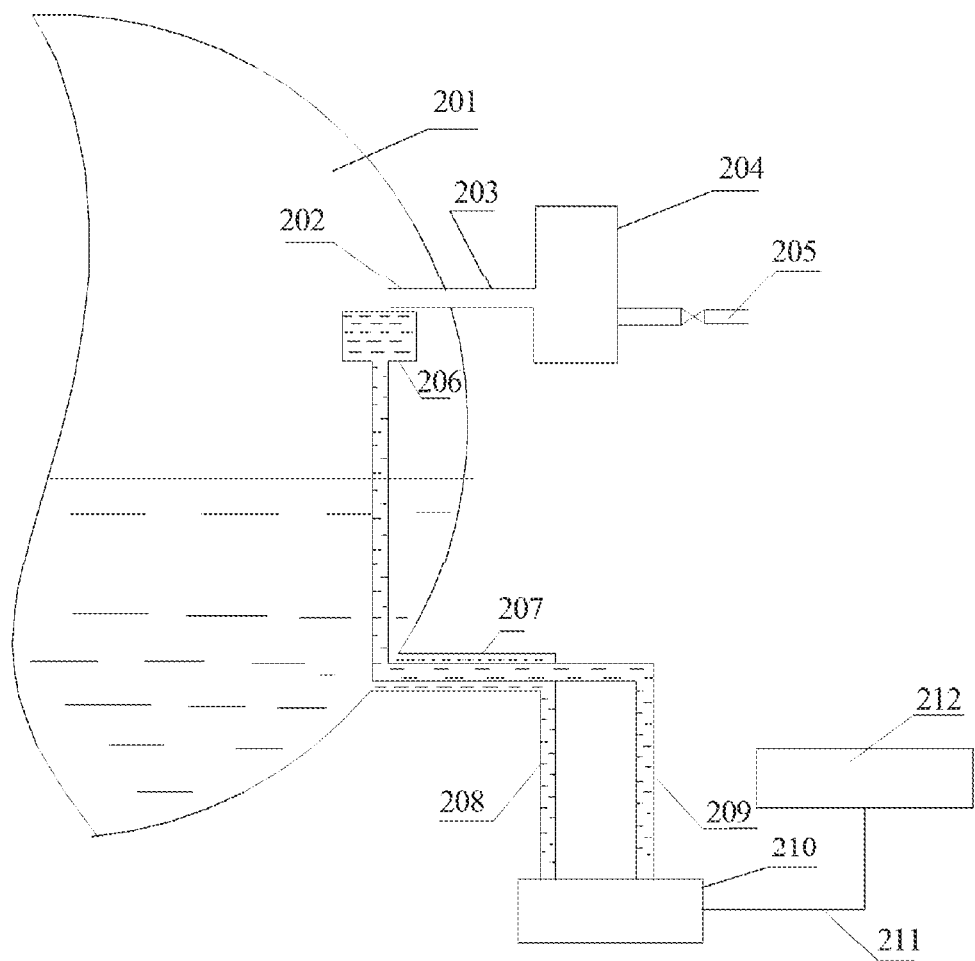
FIG. 2 is a structure diagram of an inner balance container for measuring a water level in a boiler drum.
Figure 3:
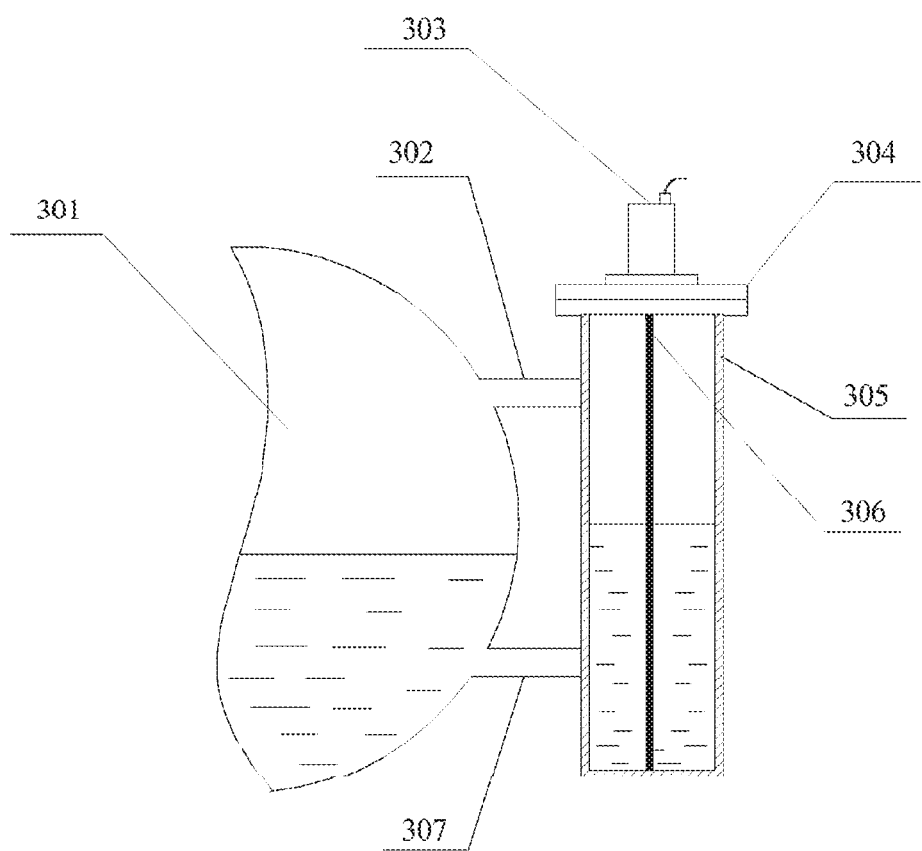
FIG. 3 is a structure diagram of a capacitive liquid level gauge.
Figure 4:
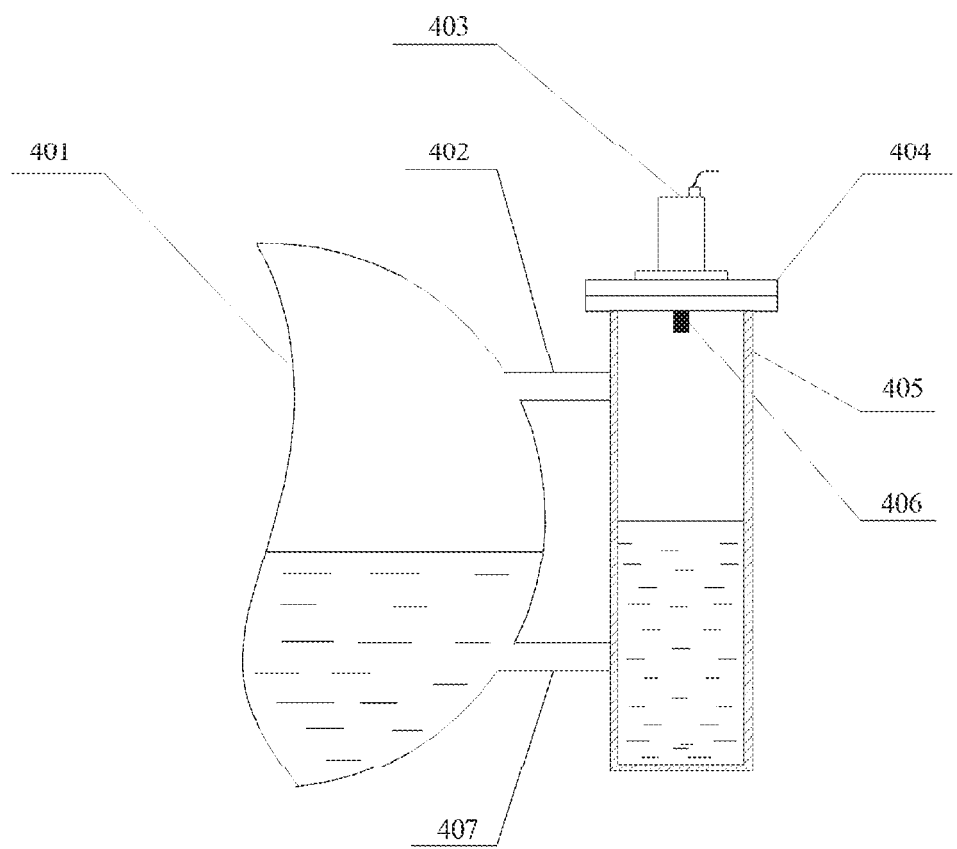
FIG. 4 is a structure diagram of a ray liquid level gauge.
Figure 5:
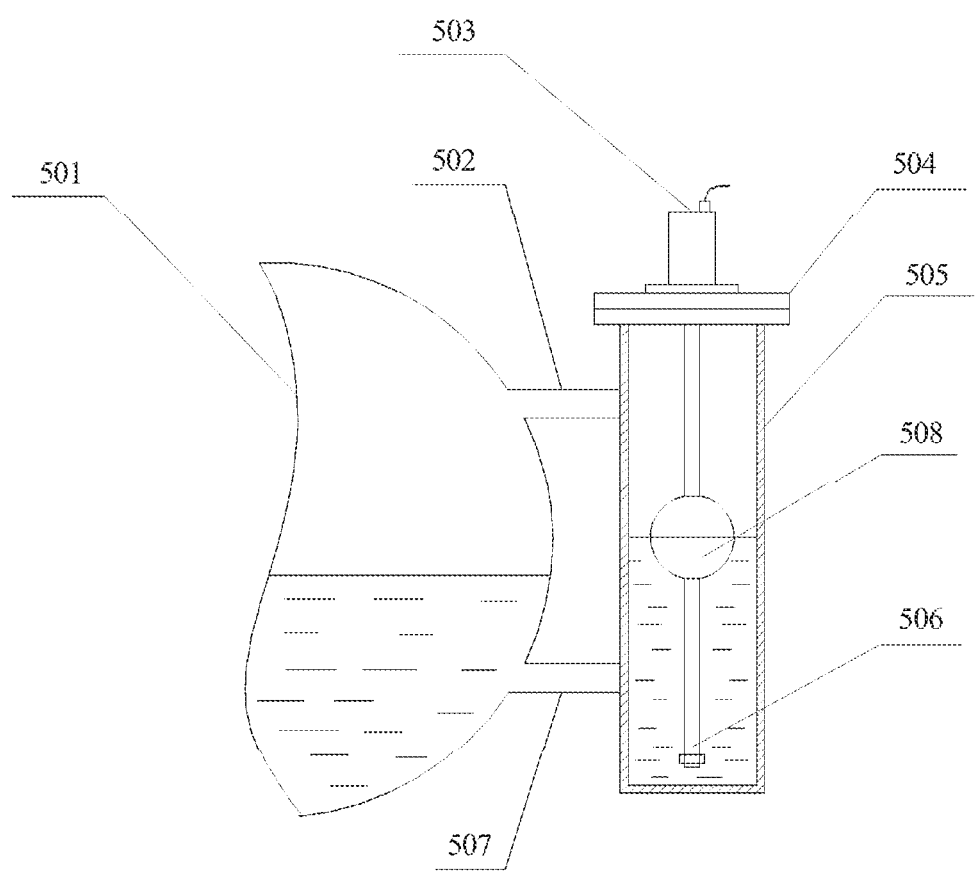
FIG. 5 is a structure diagram of a magnetic liquid level gauge.
Figure 6:
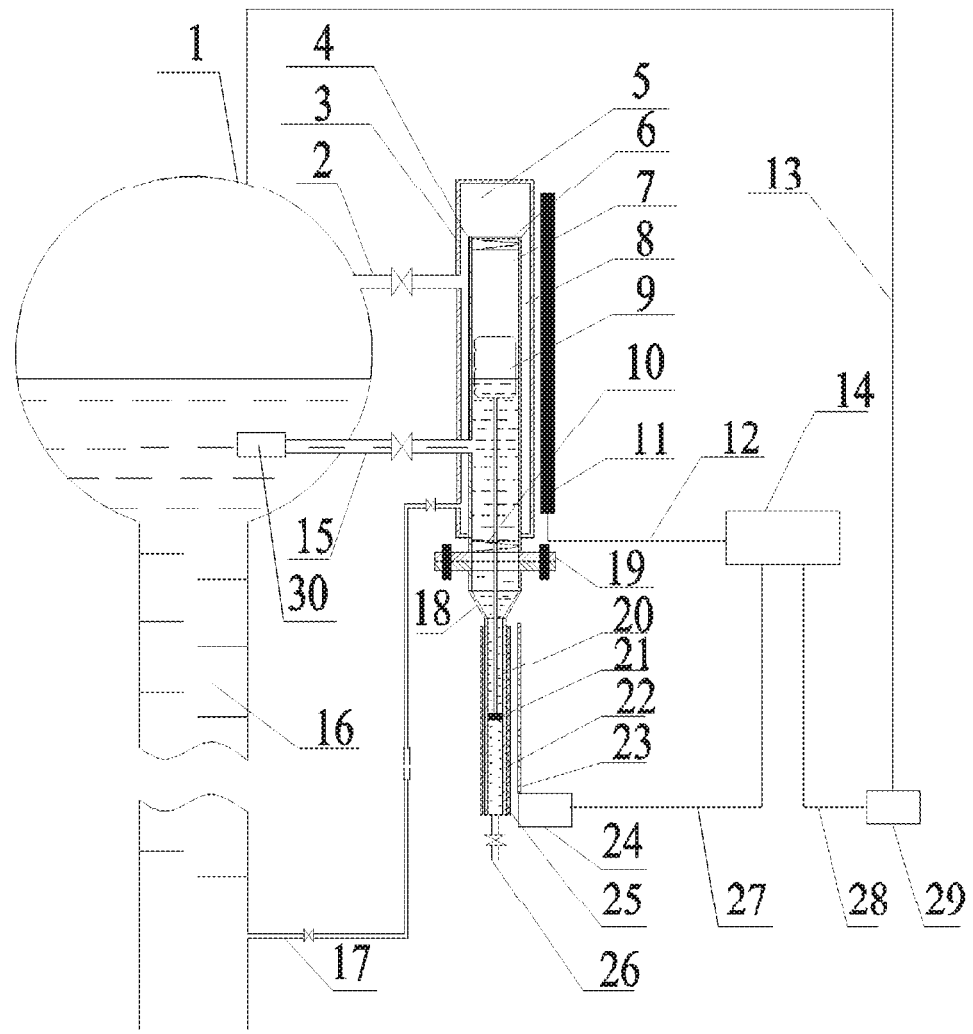
FIG. 6 is a structure diagram of one embodiment of the present application.
Figure 7:
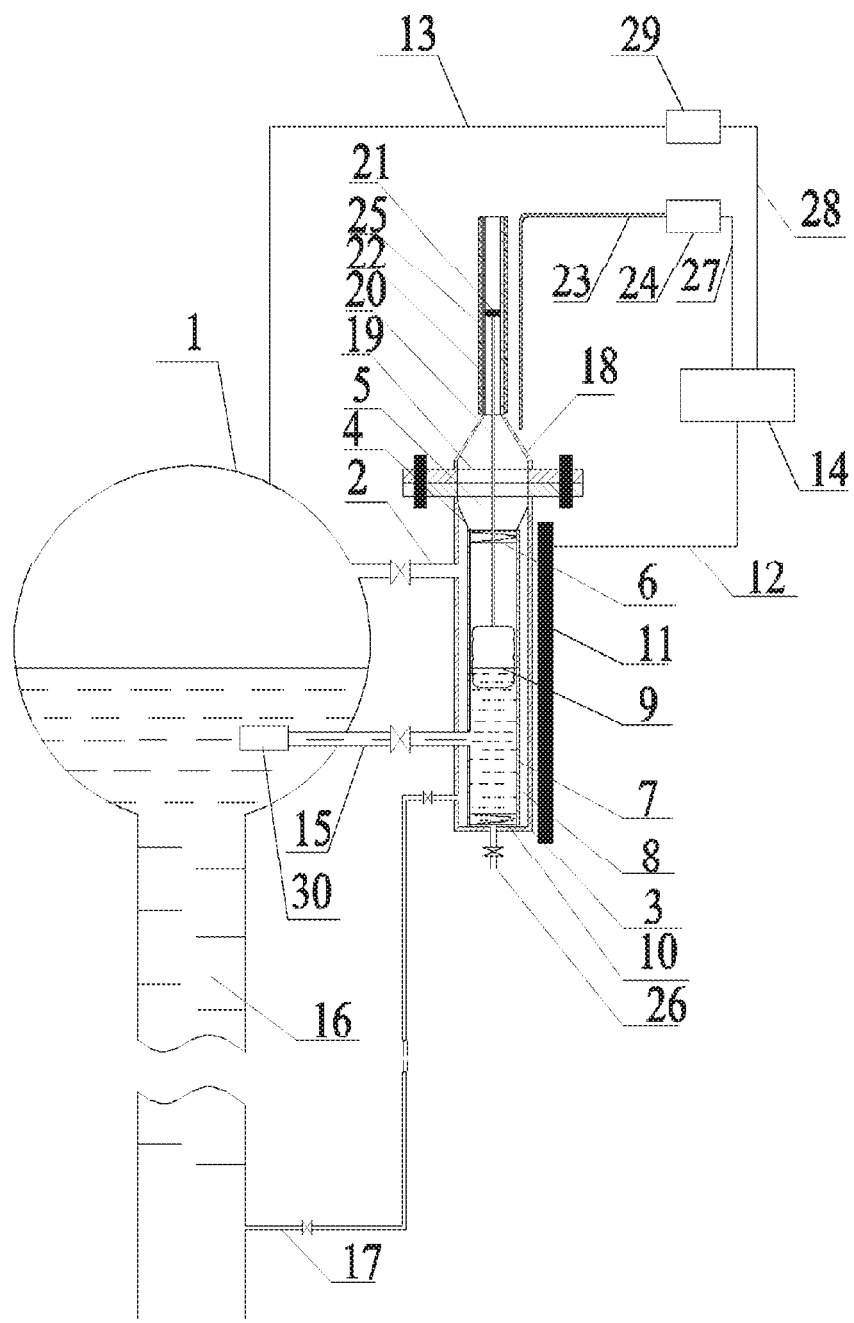
FIG. 7 is a structure diagram of another embodiment of the present application.

LIST OF THE REFERENCE NUMBERS IN FIGS. 6 and 7

1. boiler drum;
2. steam side sampling pipe;
3. external cylinder body;
4. condensation water diversion trench;
5. condensation chamber;
6. upper thrust spring;
7. internal cylinder body;
8. steam heat tracing chamber;
9. float;
10. lower thrust spring;
11. on-site display part;
12. third cable;
13. boiler drum pressure measuring instrument pipe;
14. display indicator;
15. water side sampling pipe;
16. downcomer;
17. heat tracing pipe;
18. reducer;
19. maintenance flange;
20. connecting bar;
21. magnetic component;
22. magnetic component cylinder body;
23. waveguide tube;
24. magnetic transmitter;
25. thermal insulating layer;
26. drainage pipe;
27. first cable;
28. second cable;
29. boiler drum pressure transmitter; and
30. sampler.

BRIEF DESCRIPTION OF THE PREFERRED EMBODIMENTS

In one embodiment of the present application according to FIG. 6, the water in a boiler drum is in a state of high temperature and high pressure. To reduce the errors and to ensure the sampling water to be measured has the same temperature as the water in the boiler drum, a portion of a measuring tube is configured with a dual hull structure which comprises an internal cylinder body (7) and an external cylinder body (3). The internal cylinder body (7) is connected to a boiler drum (1) through a steam side sampling pipe (2) and a water side sampling pipe (15). The sampling water to be measured is formed inside the internal cylinder body (7) due to the U-tube principle. A sampler (30) is disposed at a water side sampling point inside the boiler drum (1), and this configuration will reduce the interferences when samples are taking. The upper portion of the external cylinder body (3) is connected to the steam side of the boiler drum (1) through the steam side sampling pipe (2). The lower portion of the external cylinder body (3) is connected to a downcomer (16) through a heat tracing pipe (17). A steam heat tracing chamber (8) is formed between the internal cylinder body (7) and the external cylinder body (3), that is to say, the space between the internal cylinder body (7) and the external cylinder body (3) constitutes the steam heat tracing chamber (8). During the operation, due to the heat dispersing, the water temperature of the heat tracing pipe (17) is lower than the water temperature in the downcomer (16). With sufficient length of the heat tracing pipe (17) in the vertical direction and utilization of the U-tube principle, the liquid level within the heat tracing pipe (17) could be lower than that of the steam heat tracing chamber (8), thus allowing the steam heat tracing chamber (8) to be saturated with the steam. This will heat up the sampling water to be measured inside the internal cylinder body (7). As a result, the sampling water to be measured inside the internal cylinder body (7) and the water inside the boiler drum (1) have the substantially same temperature under all working conditions, it provides accurate measurements without the influence of its surroundings.

At same time, the internal cylinder body (7) is connected to the boiler drum (1) through the steam side sampling pipe (2) and a water side sampling pipe (15). A condensation chamber (5) is formed above the internal cylinder body (7), that is to say, the space above the top of the internal cylinder body (7) constitutes the corresponding condensation chamber (5). The bottom of the condensation chamber (5) may be connected to the top of the internal cylinder boy (7) through a condensation water diversion trench (4). The condensation water formed in the condensation chamber (5) flows along the condensation water diversion trench (4) into the internal cylinder body (7). The condensation water replaces the sampling water within the internal cylinder body (7), thus ensuring the quality of the water to be measured and lessening the possibility of scale formation.

Moreover, an upper thrust spring (6) and a lower thrust spring (10) may be disposed inside the internal cylinder body (7), such a configuration would prevent the float from being jammed. A float (9) is placed within the internal cylinder body (7), and it is connected to a magnetic component (21) through a connecting bar (20). Different working conditions lead to different water density for the sampling water, and accordingly the volume of the portion of the float (9) in suspension will vary as well. Therefore, a density compensating equation may be applied so as to further provide accurate measurements. The density compensating equation is as follow.

$$h = f(p) \times H$$

wherein, p is the boiler drum pressure;
f(p) is the single value function of the boiler drum pressure;
H is the value of the water level detected by the sensors; and h is the value of the boiler drum water level after compensation calculation.

A magnetic component cylinder body (22) and the internal cylinder body (7) within the measuring tube are connected to each other through a maintenance flange (19) and a reducer (18). At the bottom of the magnetic component cylinder body (22) a drainage pipe (26) is disposed. During the operation, the water inside the magnetic component cylinder body (22) do not move and have a relatively lower temperature, thus effectively resolving the issue of magnetism loss for the magnetic component due to the high temperature, which in turn increase the usage of the magnetic component. Moreover, the outside of the lower portion of the magnetic component cylinder body (22) may be covered with thermal insulating layer (25), the thermal insulating layer reduces the working temperature for a waveguide tube (23) and a magnetic transmitter (24) that both disposed outside thereof.

In another embodiment of the present invention according to FIG. 7, the magnetic component cylinder body (22) and the magnetic component (21) are located above the internal cylinder body (7). However such configuration does not resolve the issue of high temperature magnetism loss for the magnetic component (21).

What is claimed is:

1. A boiler system comprising: a boiler drum having a steam side sampling pipe, a water side sampling pipe and a downcomer;
a magnetic liquid level gauge for measuring a water level in the boiler drum, the magnetic liquid level gauge comprising a measuring tube having a dual hull structure comprising an external cylinder body and an internal cylinder body; a condensation water diversion trench; a condensation chamber; an upper thrust spring; a steam heat tracing chamber; a float; a lower thrust spring; an on-site display part for displaying a boiler water level; a first cable; a second cable; a third cable; a boiler drum pressure measuring instrument pipe; a display indicator; a heat tracing pipe; a reducer; a maintenance flange; a connecting bar; a magnetic component; a magnetic component cylinder body; a waveguide tube; a magnetic transmitter; a thermal insulating layer; a drainage pipe; a boiler drum pressure transmitter; and a sampler, wherein
an upper portion of the internal cylinder body and an upper portion of the external cylinder body are both connected to the boiler drum through the steam side sampling pipe;
a lower portion of the internal cylinder body is connected to a water portion of the boiler drum through the water side sampling pipe;
a lower portion of the external cylinder body is connected to the downcomer through the heat tracing pipe;
the steam heat tracing chamber is formed between the internal cylinder body and the external cylinder body;
the condensation chamber is formed above the internal cylinder body, and a bottom of the condensation chamber is connected to a top of the internal cylinder body through the condensation water diversion trench;
the upper thrust spring and the lower thrust spring are disposed inside the internal cylinder body;
the float is disposed inside the internal cylinder body and connected to the magnetic component through the connecting bar;
the magnetic component cylinder body is located beneath the internal cylinder body and connected to the internal cylinder body through the maintenance flange and the reducer;
at the bottom of the magnetic component cylinder body the drainage pipe is disposed;
the waveguide tube is disposed outside the thermal insulating layer which surrounds the magnetic component cylinder body, and the waveguide tube is connected to the magnetic transmitter disposed at the bottom of the magnetic component cylinder;
the display indicator is connected to the magnetic transmitter through the first cable, to the boiler drum pressure transmitter through the second cable, and to the on-site display part through the third cable; and
the boiler drum pressure transmitter is connected to the boiler drum through the boiler drum pressure measuring instrument pipe;
wherein the boiler drum pressure reading from the boiler drum pressure transmitter is utilized in a compensation equation performed by the display indicator to determine the boiler water level.

2. A magnetic liquid level gauge for measuring a water level in a boiler drum having a steam side sampling pipe a water side sampling pipe and a downcomer, the magnetic liquid level gauge comprising:
a measuring tube having a dual hull structure comprising an external cylinder body having a first upper portion and a first lower portion, and an internal cylinder body having a second upper portion and a second lower portion, the first upper portion and the second upper portion connected to the boiler drum through the steam side sampling pipe, the second lower portion connected to a water portion of the boiler drum through the water side sampling pipe, the external cylinder body and the internal cylinder body defining a steam heat tracing chamber therebetween;
a magnetic component cylinder body;
a magnetic component disposed in the magnetic component cylinder body;
a connecting bar;
a float disposed inside the internal cylinder body and connected to the magnetic component through the connecting bar;
a display indicator;
a boiler drum pressure transmitter and a magnetic transmitter connected to the display indicator;
a boiler drum pressure measuring instrument pipe connecting the boiler drum pressure transmitter to the boiler drum;
a heat tracing pipe connecting the first lower portion and the downcomer; a reducer and a maintenance flange connecting the magnetic component cylinder body and the internal cylinder body;
a waveguide tube disposed outside the magnetic component cylinder body and connected to the magnetic transmitter;
a drainage pipe configured to drain water from the internal cylinder body;
an on-site display part for displaying a boiler water level connected to the display indicator;
wherein a condensation chamber is provided above the internal cylinder body, and a bottom of the condensation chamber is connected to a top of the internal cylinder body through a condensation water diversion trench;

wherein the magnetic component cylinder body is located above or beneath the internal cylinder body;

wherein the boiler drum pressure reading from the boiler drum pressure transmitter is utilized in a compensation equation performed by the display indicator to determine the boiler water level.

3. The magnetic liquid level gauge according to claim 2, wherein an upper thrust spring and a lower thrust spring are disposed inside the internal cylinder body.

4. The magnetic liquid level gauge according to claim 2, wherein the magnetic component cylinder body is located beneath the internal cylinder body.

5. The magnetic liquid level gauge according to claim 4, wherein the drainage pipe is disposed at the bottom of the magnetic component cylinder body.

6. The magnetic liquid level gauge according to claim 2, wherein a thermal insulating layer surrounds the magnetic component cylinder body, thermally insulating the waveguide tube from the magnetic component cylinder body.

7. The magnetic liquid level gauge according to claim 2, further comprising a sampler disposed at a sampling point inside the water portion.

\* \* \* \* \*